US012638923B2

(12) United States Patent
Chang et al.

(10) Patent No.: US 12,638,923 B2
(45) Date of Patent: May 26, 2026

(54) TOUCHLESS IMAGE-BASED INPUT INTERFACE

(71) Applicant: Neural Lab, Inc., El Dorado Hills, CA (US)

(72) Inventors: Sherry S. Chang, El Dorado Hills, CA (US); Oliver W. Chen, El Dorado Hills, CA (US)

(73) Assignee: Neural Lab, Inc., El Dorado Hills, CA (US)

( * ) Notice: Subject to any disclaimer, the term of this patent is extended or adjusted under 35 U.S.C. 154(b) by 23 days.

(21) Appl. No.: 17/932,248

(22) Filed: Sep. 14, 2022

(65) Prior Publication Data

US 2023/0085330 A1      Mar. 16, 2023

Related U.S. Application Data

(60) Provisional application No. 63/261,242, filed on Sep. 15, 2021.

(51) Int. Cl.
  *G06F 3/01*      (2006.01)
  *G06F 3/04812*      (2022.01)
  *G06F 3/04815*      (2022.01)
  *G06F 3/0484*      (2022.01)
  *G06V 40/20*      (2022.01)

(52) U.S. Cl.
  CPC .............. *G06F 3/017* (2013.01); *G06F 3/011* (2013.01); *G06F 3/04812* (2013.01); *G06F 3/04815* (2013.01); *G06F 3/0484* (2013.01); *G06V 40/28* (2022.01)

(58) Field of Classification Search
  None
  See application file for complete search history.

(56) References Cited

U.S. PATENT DOCUMENTS

| | | | |
|---|---|---|---|
| 6,204,828 B1 * | 3/2001 | Amir ....................... | G06F 3/013 |
| | | | 345/157 |
| 2009/0079813 A1 * | 3/2009 | Hildreth ................... | G06F 3/017 |
| | | | 348/E7.078 |
| 2009/0217211 A1 * | 8/2009 | Hildreth .............. | G06F 3/04842 |
| | | | 715/863 |
| 2009/0315740 A1 * | 12/2009 | Hildreth ................... | G06F 3/017 |
| | | | 341/20 |

(Continued)

OTHER PUBLICATIONS

ISA United States Patent and Trademark Office, International Search Report and Written Opinion Issued in Application No. PCT/US22/76441, Dec. 14, 2022, WIPO, 16 pages.

*Primary Examiner* — Linda Huynh
(74) *Attorney, Agent, or Firm* — Sheppard Mullin Richter & Hampton LLP

(57) ABSTRACT

A method for input detection at a computing device includes receiving, from a camera, a plurality of images depicting a user hand. The plurality of images are processed to detect a plurality of user intent parameters, including a predefined activation gesture performed by the user hand. Responsive to the plurality of user intent parameters satisfying a gesture input activation condition, the plurality of images are processed to detect a movement of the user hand consistent with a predefined input gesture. The predefined input gesture is mapped to a computer control action, and the computer control action is performed in response to the predefined input gesture.

19 Claims, 14 Drawing Sheets

200

RECEIVE A PLURALITY OF IMAGES DEPICTING A USER HAND OF A HUMAN USER          202

PROCESS THE PLURALITY OF IMAGES TO DETECT A PLURALITY OF USER INTENT PARAMETERS, INCLUDING A PREDEFINED ACTIVATION GESTURE PERFORMED BY THE USER HAND          204

RESPONSIVE TO THE PLURALITY OF USER INTENT PARAMETERS SATISFYING A GESTURE INPUT ACTIVATION CONDITION, PROCESS THE PLURALITY OF IMAGES TO DETECT MOVEMENT OF THE USER HAND CONSISTENT WITH A PREDEFINED INPUT GESTURE          206

MAP THE PREDEFINED INPUT GESTURE TO A COMPUTER CONTROL ACTION          208

PERFORM THE COMPUTER CONTROL ACTION IN RESPONSE TO THE PREDEFINED INPUT GESTURE          210

(56)                    References Cited

U.S. PATENT DOCUMENTS

| | | | |
|---|---|---|---|
| 2011/0279368 A1* | 11/2011 | Klein ...................... | G06F 3/011 |
| | | | 382/128 |
| 2012/0206347 A1* | 8/2012 | Chen .................... | G06F 3/0317 |
| | | | 345/157 |
| 2012/0272179 A1* | 10/2012 | Stafford ................ | G06F 3/0482 |
| | | | 345/157 |
| 2014/0062861 A1* | 3/2014 | Yamashita .............. | G06F 3/011 |
| | | | 382/103 |
| 2014/0062862 A1* | 3/2014 | Yamashita ........... | G06V 40/174 |
| | | | 382/103 |
| 2014/0201666 A1* | 7/2014 | Bedikian ............... | G06F 3/0325 |
| | | | 715/771 |
| 2014/0267031 A1 | 9/2014 | Huebner | |
| 2015/0040040 A1* | 2/2015 | Balan .................... | G06F 3/011 |
| | | | 715/762 |
| 2015/0123890 A1* | 5/2015 | Kapur .................... | G06F 3/011 |
| | | | 345/156 |
| 2015/0193124 A1* | 7/2015 | Schwesinger ....... | G06F 3/04812 |
| | | | 715/863 |
| 2016/0224123 A1* | 8/2016 | Antoniac ........... | G06F 3/04815 |
| 2016/0378294 A1* | 12/2016 | Wright ................ | G06F 3/04815 |
| | | | 715/851 |
| 2019/0294312 A1 | 9/2019 | Rohrbacher | |
| 2019/0361521 A1* | 11/2019 | Stellmach ........... | G06F 3/04812 |
| 2019/0362557 A1* | 11/2019 | Lacey ...................... | G06T 5/20 |
| 2021/0141511 A1* | 5/2021 | Li ........................... | G06F 3/017 |
| 2022/0214743 A1* | 7/2022 | Dascola ................. | G06F 3/011 |
| 2022/0382377 A1* | 12/2022 | Hosseinkhani Loorak ................ | |
| | | | G06F 3/04847 |

* cited by examiner

200

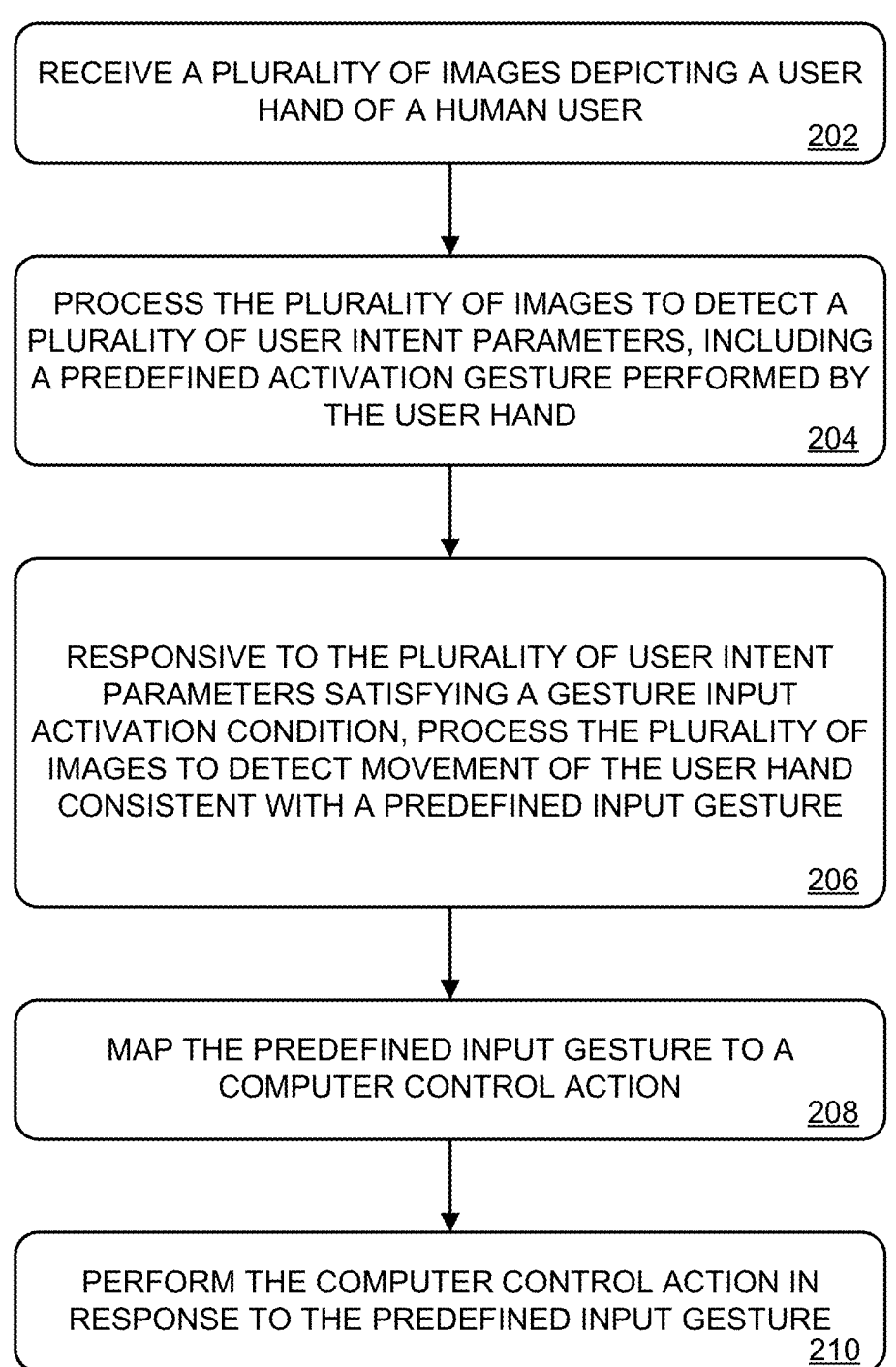

RECEIVE A PLURALITY OF IMAGES DEPICTING A USER HAND OF A HUMAN USER
202

PROCESS THE PLURALITY OF IMAGES TO DETECT A PLURALITY OF USER INTENT PARAMETERS, INCLUDING A PREDEFINED ACTIVATION GESTURE PERFORMED BY THE USER HAND
204

RESPONSIVE TO THE PLURALITY OF USER INTENT PARAMETERS SATISFYING A GESTURE INPUT ACTIVATION CONDITION, PROCESS THE PLURALITY OF IMAGES TO DETECT MOVEMENT OF THE USER HAND CONSISTENT WITH A PREDEFINED INPUT GESTURE
206

MAP THE PREDEFINED INPUT GESTURE TO A COMPUTER CONTROL ACTION
208

PERFORM THE COMPUTER CONTROL ACTION IN RESPONSE TO THE PREDEFINED INPUT GESTURE
210

| Gesture Type | Trigger Action | Anchor Point | Lock? |
|---|---|---|---|
| Thumb & Index Pinch | Left Mouse Click | Wrist | Yes |
| Fist | Middle Mouse Scroll | Wrist | Yes |
| Index Up | Drag and Drop | Index Finger Tip | No |
| Palm Open | Move mouse cursor | Palm | No |

Option 1 – User use locking gesture to reposition mouse cursor

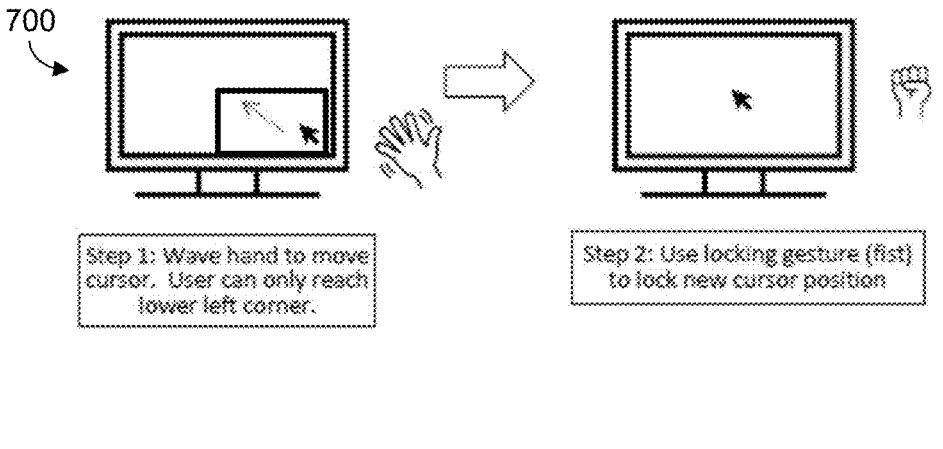

700

Step 1: Wave hand to move cursor. User can only reach lower left corner.

Step 2: Use locking gesture (fist) to lock new cursor position

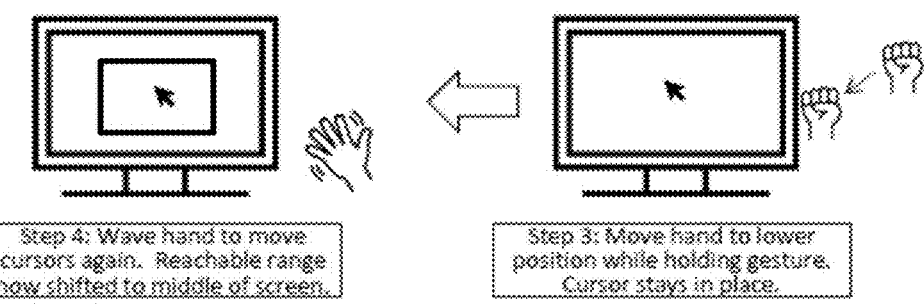

Step 4: Wave hand to move cursors again. Reachable range now shifted to middle of screen.

Step 3: Move hand to lower position while holding gesture. Cursor stays in place.

Option 2 – User use point gesture to directionally reposition mouse cursor

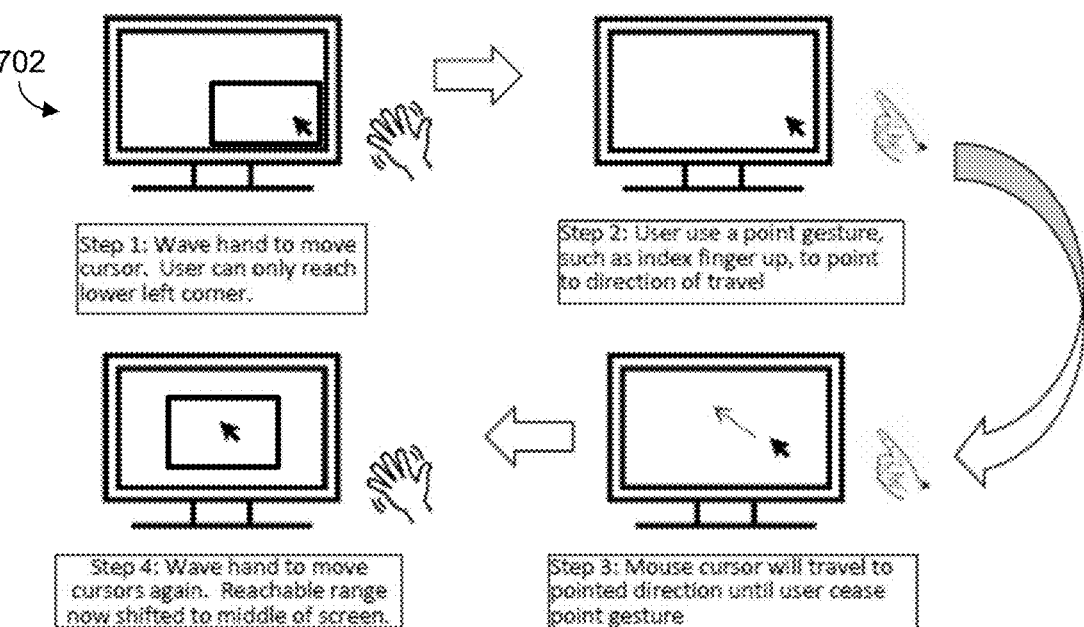

702

Step 1: Wave hand to move cursor. User can only reach lower left corner.

Step 2: User use a point gesture, such as index finger up, to point to direction of travel Step 4: Wave hand to move cursors again. Reachable range now shifted to middle of screen.

Step 3: Mouse cursor will travel to pointed direction until user cease point gesture

| Gesture Type | Trigger Action | Applications | Context |
|---|---|---|---|
| Thumb & Index Pinch | Left Mouse Click | All | Work |
| Fist | Middle Mouse Scroll | All | Home |
| Index Up | Drag and Drop | Alien attack game, Video calls | Work, Game |
| Palm Open | Move mouse cursor | All | Home |

TOUCHLESS IMAGE-BASED INPUT INTERFACE

CROSS REFERENCE TO RELATED APPLICATIONS

This application claims priority to U.S. Provisional Patent Application No. 63/261,242 filed Sep. 15, 2021, the entirety of which is hereby incorporated herein by reference for all purposes.

BACKGROUND

Computer user interfaces in recent decades have largely relied upon keyboards, mice, joysticks, and other input peripherals that are physically manipulated/touched by a user. These types of input mechanisms are very effective and remain ubiquitous. In addition, many contemporary interfaces leverage touch sensors, motion sensors, audio recognition, and interpretation of captured images, e.g., of hand gestures or natural inputs indicating position of an input relative to displayed content. Regarding image-based interfaces, those systems are steadily improving, though accurate recognition/interpretation across diverse use case settings can involve significant complexity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for input detection at a computing device includes receiving, from a camera, a plurality of images depicting a user hand. The plurality of images are processed to detect a plurality of user intent parameters, including a predefined activation gesture performed by the user hand. Responsive to the plurality of user intent parameters satisfying a gesture input activation condition, the plurality of images are processed to detect a movement of the user hand consistent with a predefined input gesture. The predefined input gesture is mapped to a computer control action, and the computer control action is performed in response to the predefined input gesture.

BRIEF DESCRIPTION OF THE DRAWINGS

FIG. 2 illustrates an example method for user input detection.

FIG. 4 shows an example anchor point locking decision table that may be employed for a cursor locking operation performed by a computing device.

FIG. 7 shows two example lock and scroll scenarios for moving a cursor during a touchless interaction.

FIG. 10 shows an example context-based gesture mapping scheme.

DETAILED DESCRIPTION

Many user interfaces require a user to contact a keyboard, touchscreen, or other structure to operate the interface. The need for physical contact can be undesirable in some settings. For example, to avoid transmission of viruses or other pathogens, a contact-free interface can be a great benefit in shared devices, such as ATMs, information kiosks, point-of-sale systems, and the like. Contact free interfaces are also useful in sterile environments like hospitals and surgical suites, heavily soiled environments like garages or industrial settings, controlling devices from distance such as for presentation purposes, or elevated experiences for mixed reality immersive gaming and training. Furthermore, previous attempts at solutions for touchless user interfaces have required proprietary add-on peripheral devices that rely on three-dimensional (3D) time of flight cameras, infrared sensors, gyroscopes, or other sensors that result in complex and costly touchless user interfaces.

Accordingly, the present disclosure is directed to computing systems and corresponding computer-implemented methods for implementing a touchless user interface that uses image processing to recognize gesture inputs from a user and translate such gesture inputs into commands for controlling the touchless user interface in a simple and cost-effective manner. As discussed in further detail below, various optimization operations may be performed to improve touchless interactions with the touchless user interface. Though touch-free operation is often desirable, the computing system described herein can also provide significant benefits in settings where avoiding device contact is not a concern.

Figure 1A:
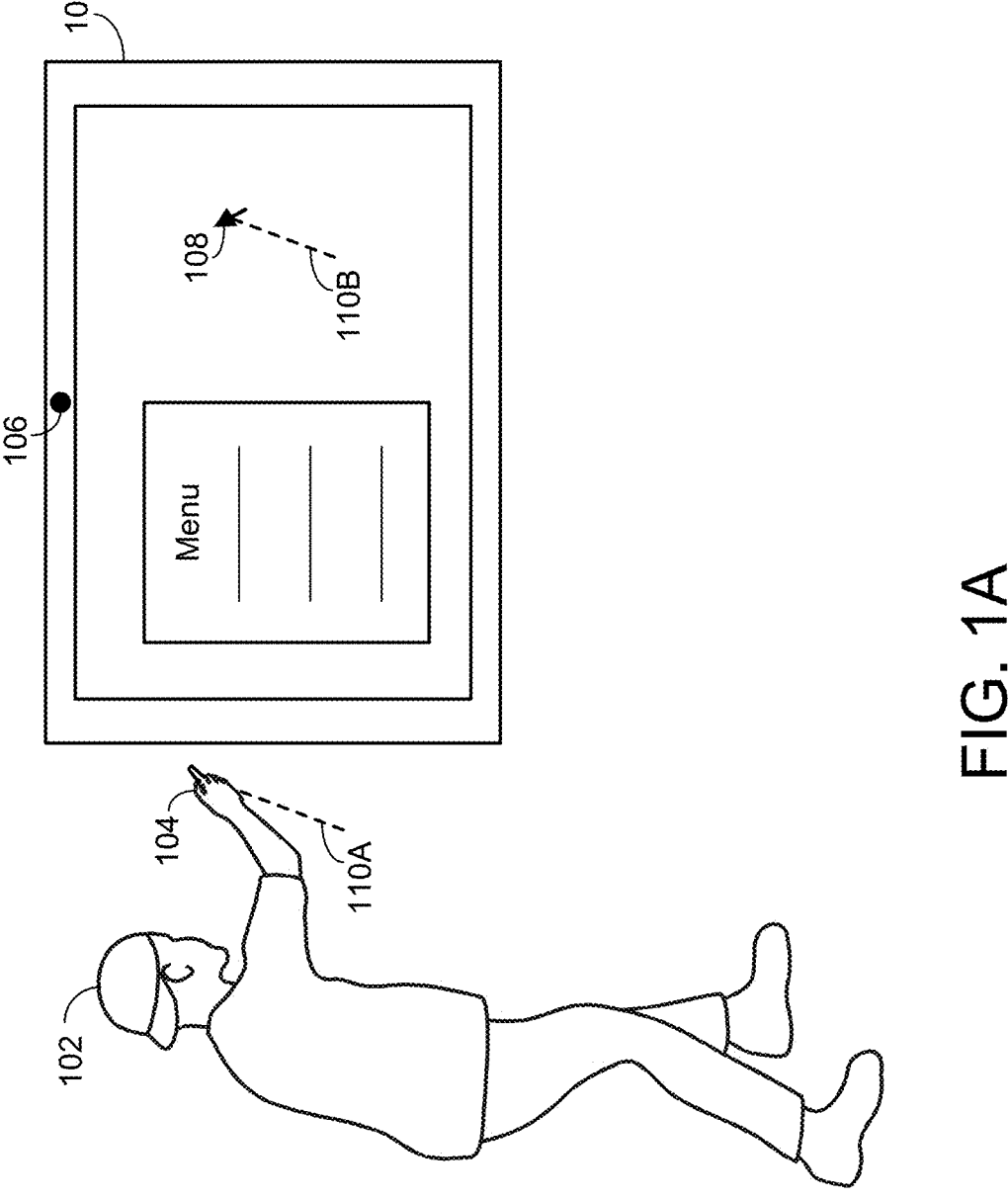
FIGS. 1A and 1B schematically illustrate a computing device receiving a plurality of images depicting a user hand of a human user.

FIG. 1A schematically depicts an example scenario in which a computing device 100 is controlled by a human user 102. Specifically, the human user provides input to the computing device by moving their hand 104. Movements of the user's hand are detected by a camera 106 of the computing device. In this example, the computing device responds to the user's hand movement by moving the displayed position of an on-screen graphical cursor 108. This is indicated by the dashed line 110A extending from the user hand, indicating movement of the hand over time, and corresponding to the dashed line 110B extending from the graphical cursor, indicating movement of the cursor over time.

It will be understood that the computing device depicted in FIG. 1 is non-limiting and highly-simplified for the sake of illustration. The techniques described herein may be implemented by any suitable computing system of one or more computing devices, and each computing device may have any suitable capabilities, hardware configuration, and form factor. In some examples, the techniques described herein may be implemented by computing system 1100 described below with respect to FIG. 11.

Figure 1B:
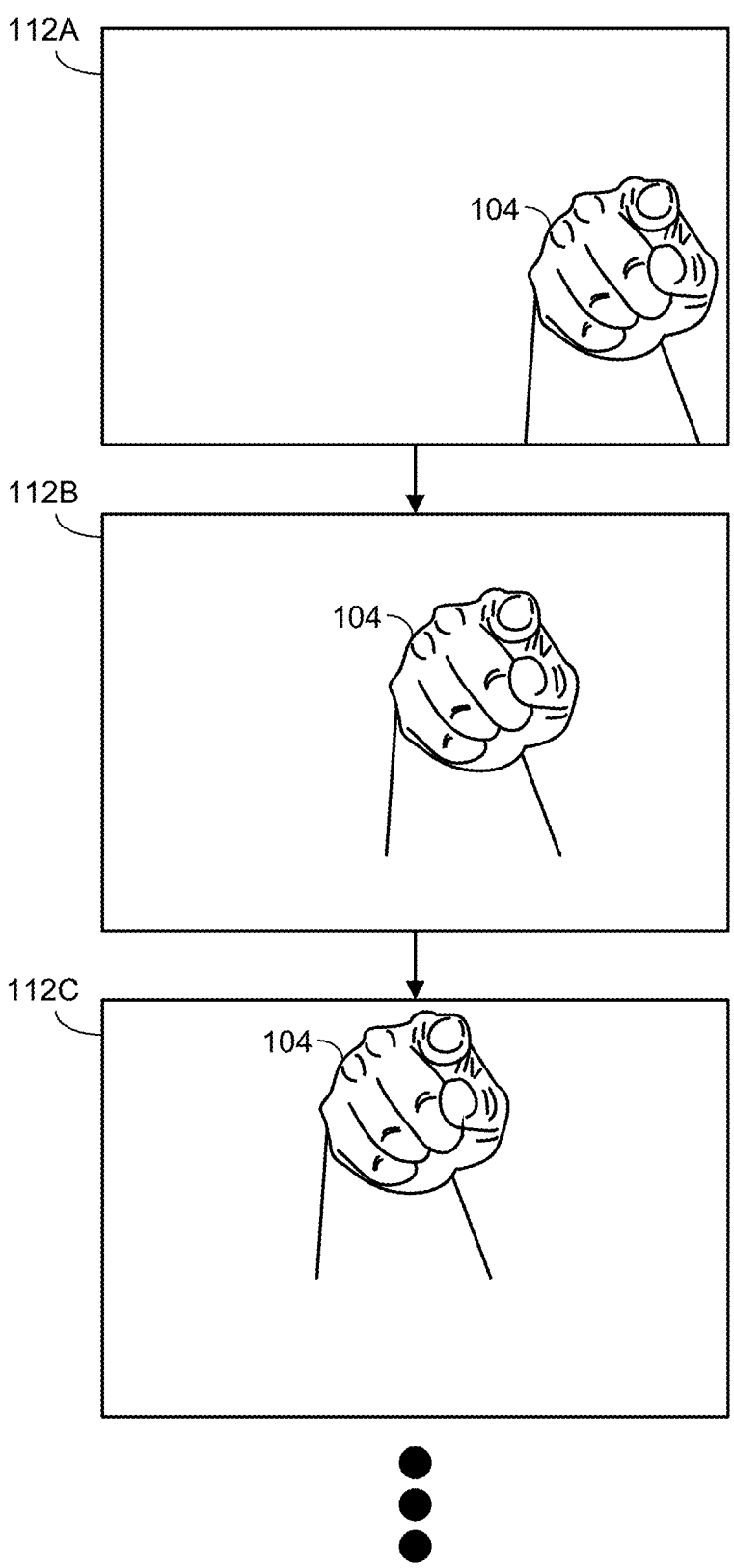

Movement of the user hand is detected via images captured by camera 106. This is illustrated in FIG. 1B, showing three example images 112A-112C captured by camera 106 and depicting user hand 104. For the sake of simplicity, only the user hand and a portion of the user's wrist are shown in images 112A-112C. It will be understood that any or all of a user's body may be depicted in images captured as described herein, along with all or part of one or more other users, background environmental details, etc.

In FIG. 1B, each of images 112A-112C are captured at different moments in time during the movement of the user hand. As such, the hand is visible at different positions in each image. In this manner, the computing device may process the plurality of images to detect the movement of the user hand, and may respond to the movement appropriately, as will be described in more detail below. It will be understood that any suitable number of different images may be captured, and such images may be captured at any suitable rate.

Any type of optical input mechanism may be employed for capturing the images that are processed to control the touchless user interface. That said, in some examples it will be particularly advantageous to employ simple, widely-available two-dimensional (2D) cameras that operate in red, green, blue (RGB) color, grayscale or other visible light domains. In other words, the plurality of images captured by the camera may include two-dimensional image pixel data having RGB color values. The techniques described herein may beneficially be implemented using an integrated web-cam of the computing device, alleviating the need to acquire and configure an external camera. As will be described below, such a system can leverage existing image recognition components and avoid much of the complexity and cost found in depth-based tracking and other 3D systems. Further, in some examples, such a system may allow for "plug and play" operation that does not require complex Application Programming Interface (API) or Software Development Kit (SDK) integration.

The recognition of gestures herein may utilize a combination of computer vision and deep learning to create the aforementioned touchless, contactless user interface that utilizes only commonly available 2D cameras. As one example, computer vision and deep neural network (DNN) learning may be used to detect human hand and finger positions, which are then mapped to displayed user interface elements (e.g., buttons displayed on a screen). The described computer-implemented methods employ novel combinations of AI models and post-network processing to identify gestures under different environmental conditions. Non-limiting examples of suitable AI and/or machine learning (ML) techniques will be described below with respect to FIG. 11. For example, such processing may be performed to differentiate between right and left hands, different skin colors, fingers wearing gloves, lighting conditions, and primary versus secondary interactions when multiple users are within the camera field of view.

FIG. 2 illustrates an example method 200 for providing input to a computing device. Steps of method 200 may be performed by any suitable computing system of one or more computing devices. As one example, method 200 may be implemented by computing system 1100 described below with respect to FIG. 11.

At 202, method 200 includes receiving a plurality of images depicting a user hand of a human user. This may be done substantially as described above with respect to FIGS. 1A and 1B. More particularly, the plurality of images may be captured by any suitable camera or array of cameras. For example, the camera may include a 2D webcam or another readily-available "off the shelf" camera.

At 204, method 200 includes processing the plurality of images to detect a plurality of user intent parameters. In general, a "user intent parameter" refers to any suitable data or context that is useable to determine whether the user is intending to control the computing device, and/or whether the computing device should treat a future movement of the user hand as a control input.

As one example, the plurality of user intent parameters includes a predefined activation gesture performed by the user hand. For instance, the activation gesture may include pointing toward the computing device with an index finger, as is shown in FIGS. 1A and 1B. More generally, the user may perform an activation gesture or pose, or sequence of gestures and poses, that indicate the intent to start a touchless interaction that is captured via the image feed. A computing system is configured to process the image feed to recognize the user's gesture(s), determine that the gesture(s) correspond to the appropriate activation gesture(s), and initiate a touchless interaction based on the recognized activation gesture(s). In other words, the computing system is configured to initiate an interaction between the user and the touchless user interface when specified rules or conditions are met based on the touchless user input, referred to herein as a "gesture input activation condition."

In some examples, the computing system may be configured to recognize individual gestures, such as hand gestures, as user intent parameters. In some examples, the computing system may be configured to recognize multi-modal gestures that include multiple body parts, such as hand gestures in combination with eye gaze tracking, head pose, etc. In some examples, the computing system may leverage audio modalities such as speech recognition. In other words, the plurality of user intent parameters may include detected speech of the human user—e.g., detected via a microphone communicatively coupled with the computing system.

Assessing user intent before interpreting a user's hand movements as an input gesture can help alleviate scenarios where a user's hand movements are interpreted by the computing system as unintended control inputs, causing unexpected behavior. For example, a user may be speaking with another person while moving their hand, without intending to manipulate the interface. This can also alleviate scenarios where multiple users are visible in captured images, and only one (or none) of the users are attempting to control the computing device. As such, the plurality of user intent parameters may include a recognized identify of the human user. For instance, the plurality of images captured by the camera may include a face of the human user, and thus the identity of the human user may be recognized via facial recognition. Additionally, or alternatively, the identity of the human user may be recognized in other suitable ways—e.g., speech recognition, security authentication (e.g., asking the user to provide password or respond to a security challenge), skin tone analysis, etc. In general, the techniques described herein can either rely on fixed pre-configured parameters, or rely on an AI algorithm that studies interaction patterns and makes dynamic real time determinations as to whether the gesture input activation condition is met.

More generally, the plurality of user intent parameters may include any of the following non-limiting examples. The plurality of user intent parameters may include a number of different detected human users in the plurality of images. For instance, depending on the use case, some scenarios call for only one hand and one user—e.g., a surgeon manipulating images during surgery—or the scenario may call for multiple users and multiple hands—e.g., in a multiplayer gaming scenario. Thus, in various cases, the gesture input activation condition may only be met if only one user is visible (e.g., a surgeon performing an operation), or the condition may only be met if two or more users are visible (e.g., a multiplayer gaming scenario).

The plurality of user intent parameters may include detecting a predetermined triggering sequence to determine whether interaction with the computing system system should start or end. This may include performing a pre-defined activation gesture as described above—e.g., a user holding their palm up for fixed interval, or a more compli-cated sequence of gestures that users are relatively unlikely to accidentally trigger, such as palm up, peace sign, fist, etc. In some cases, the triggering sequence may include move-ments or poses performed by more than one part of the user's body—e.g., movements of both hands, movements of the user's head, an orientation of the user's torso or body relative to the camera, etc. In other words, the plurality of user intent parameters may include poses of one or more additional user body parts of the human user other than the user hand. An end sequence (e.g., a sequence that causes the computing system to discontinue interpreting user hand movements as control inputs) could be simple, such as a user putting their palm down, looking away from the screen, or performing other actions that indicate disengagement.

The plurality of user intent parameters may include a detected gaze direction of the user eye—e.g., in cases where the plurality of images depict an eye of the human user. In other words, the gesture input activation condition may only be met if the user is gazing at the screen, while the condition may not be met if the user is looking away from the screen. It will be understood, however, that eye gaze detection may not be suitable in all scenarios, and thus other user intent parameters may additionally or alternatively be considered. In some cases, the computing system may employ back-ground segmentation techniques to remove background noise, allowing image processing to focus only on actors in the foreground with active movement.

The plurality of user intent parameters may include detecting a presence of a recognized object held by the user hand, in cases where such a recognized object is depicted in the plurality of images captured by the camera. In other words, the computing system may employ object detection to assess the intention of the users in the environment. In known activities, detecting specific held objects in an envi-ronment can indicate the desired action to be executed (like painting broad strokes with a brush vs drawing with a fine line pencil in art, or moving a yoke or pushing a lever in a plane). This allows for the correct activity to be triggered on the application without the physically held object needing to be fully mechanically instrumented and connected to the application itself. Object detection further assesses intent when held objects partially obscure portions of the hand itself, as the visible grip or body pose will limit the possible intended actions. Object detection can also be employed as a switching mechanism for which is the primary hand of the actor in an environment. For example, if a surgeon initiates the trigger action sequence with their dominant hand, and then uses it to pick up a medical instrument, their non-dominant hand may continue to control the user interface.

In some cases, the computing system may track the speed and/or consistency of a user's movement. This can be used as an evaluation of performance to see how well a specific motion was executed as compared to the optimally intended motion, and can be used to generate a recommendation for physical retraining of the user. Regularly collected motion data over time can also be used to retrain the DNN models used to tailor the detection of intent to a particular person, or to compensate for changes in range of motion over time.

The computing system may be configured to perform gesture recognition using any type of neural network, gen-erated through any suitable training process. For example, a series of images of the image feed may be looped and continuously processed, e.g., using deep neural network processing, to extract the hand and body pose and/or other features of the user. A combination of DNN pre-trained body and hand pose models may be employed. A non-ML algo-rithm may be used to detect the hand based on the shape and color of the hand to compensate for DNN model weaknesses (such as the inability to detect a hand without an elbow being visible). If the hand location cannot be determined due to the lack of elbow joints or lighting conditions obscuring skin color detection, hand shape detection using custom training may also be used. Further, if accuracy for a hand inference is low, computer vision techniques can be used to increase the variability in skin tone and soilage. Because the manner in which a person makes a fist varies from person to person based on the physical attributes of the person's hand, such as the length, thickness, and flexibility of the digits in the hand, these digits in the hand can be decomposed into their root vector elements based on angle and direction without length. This allows a definition of a gesture to be identified correctly across many different physical attributes. The computing system may be configured to employ any suitable ML and NN technology for gesture recognition.

As discussed above, the computing system optionally may be configured to process the image feed to recognize facial features or key points of the user's face to create a unique identifier for the user. Such facial feature-based unique user identification may allow for the computing system to be capable of providing collaborative multi-user touchless interactions. By uniquely identifying multiple different users in this manner, the computing system may be configured to recognize multiple different gestures per-formed at the same time and associate the different gestures with different users such that multiple users can interact with the touchless user interface simultaneously. For example, such a collaborative interaction may include two users each using both hands, such that the computing system may track all four hands and associate the gestures of those hands to specific users at the same time. As one example, such a collaborative multi-user touchless interaction may include simulating unfurling of a large flag between two people using all four hands. Another simpler example is a multi-player gaming scenario where the computing system can recognize multiple players and track their individual non-collaborative actions throughout the game.

It will be understood that such facial feature-based unique user identification is applicable to scenarios where the camera can capture a user's face in the plurality of images. In other scenarios where a user's face is not captured by the image feed, the computing system may be configured to employ other user identification techniques. For user authentication purposes, the computing system may also lock interactions only to people that match preset facial key points or multi model body gestures that uniquely identify the individual (such as by performing a simple air signature). This is desirable in cases where it is intended that only authorized users are able to control the computing device.

Returning briefly to FIG. 2, at 206, method 200 includes processing the plurality of images to detect a movement of the user hand consistent with a predefined input gesture, responsive to the plurality of user intent parameters satisfying the gesture input activation condition. As discussed above, the gesture input activation condition may be satisfied based on any suitable combination of the user intent parameters—e.g., based on detecting a predefined input gesture, eye gaze direction, number of visible users, a recognized identity of the user, etc. It will be understood that different user intent parameters may be considered depending on the implementation. In general, the techniques described herein can either rely on fixed pre-configured parameters, or rely on an AI algorithm that studies interaction patterns and make dynamic real time determinations as to whether the gesture input activation condition is met.

The movement of the user hand may be mapped to a predefined input gesture in any suitable way. Any suitable number and variety of different input gestures may be recognized—e.g., index finger pointing, palm out, palm down, peace sign, thumb and pinkie extending laterally away from one another, etc. Such gestures are generally detected through computer vision analysis of the captured images, which can be done in any suitable way depending on the implementation.

Figure 14:
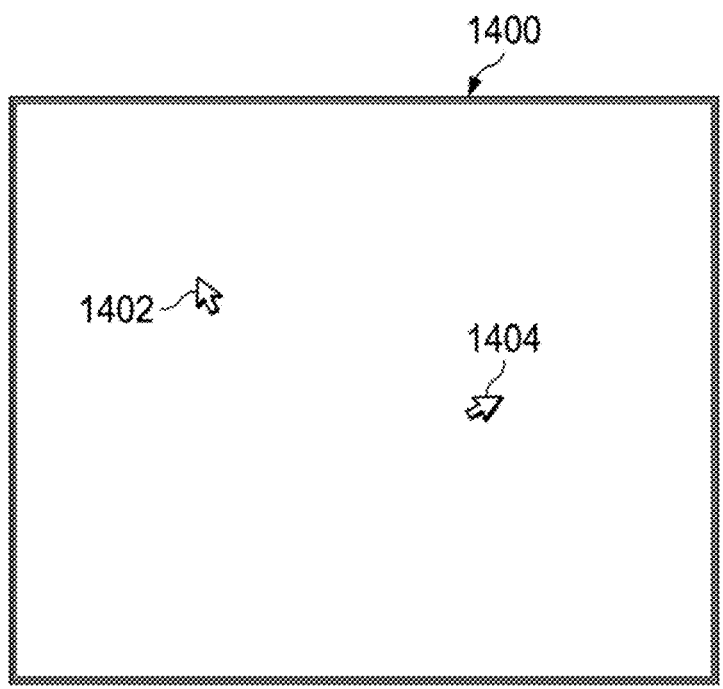
FIG. 14 shows an example graphical user interface with two cursors associated a respective hand of two different human users.

In some cases, the computing system may display one or more on-screen graphical cursors, where each cursor may be associated with a different user hand—e.g., only one cursor is displayed when only one user hand is detected. For instance, see graphical cursor 108 shown in FIG. 1A. Each displayed cursor can be controlled by user motion—e.g., as a user hand moves, the cursor correspondingly moves. In some cases, the cursor may be moved by a distance and in a direction determined based at least in part on the detected movement of the user hand. However, in other scenarios, cursor movement may be at least partially independent of the movement of the user hand, as will be described in more detail below. In cases where more than one user is present, more than one cursor may be displayed—e.g., the system displays a second on-screen graphical cursor associated with a second user hand of a second human user. The user can provide subsequent gestures that are processed by the computing system to trigger an action on the touchless user interface. Some such gestures may be associated with the cursor. Other such gestures may be independent of the cursor. FIG. 14 illustrates a graphical user interface 1400 having a first on-screen graphical cursor 1402 associated with a first user hand of a first human user and a second on-screen graphical cursor 1404 associated with a second user hand of a second human user.

In one example, the movement/position of a user's body or body parts (e.g., hands) is translated into desired UI events. XY coordinates of visual elements like hand digits may be mapped to one or more UI elements (a cursor, buttons, keypad, etc.). One aspect of interpretation may involve time spent hovering over a UI element. For example, a hovering time beyond a threshold duration may trigger a determination that a user is intending to actuate the displayed UI element, as opposed to just passing over it while moving to another element.

In some examples, even using conventional 2D cameras, 3D information may be approximated or derived to assist with gesture recognition and/or multi-user touchless input scenarios. When such techniques are employed, 3D information (or the Z coordinate information) may be approximated from 2D data using assumptions of how long the average length of a joint pair is of a user's body parts. If secondary cameras are used, the 3D positional data is fused so the occluded view is supplemented by the other camera (s). Additionally, a buffer of frames can be stored so that, for example, if previously an elbow was visible, and it has currently moved off screen, the previous frame can be used in composite to augment and assume where it positionally would exist off frame to give positional data of the user for gesture recognition and/or other processing.

In some cases, various optimizations may be applied to the user input/gestures to improve touchless interaction with the touchless user interface as will be discussed in further detail below. For example, such optimization operations may include, but are not limited to, stability control, anchor point optimization, and awareness of user intent.

Jitter is a frequent issue where the focus of interaction, such as a mouse pointer or a pointing finger, jumps around too much to perform any action with accuracy. Overcompensation of jitter also creates issues by causing interactions that feel sluggish. In some examples to address such issues, the computing system may be configured to perform stability control optimizations to the user input/gestures. In other words, movement of a displayed on-screen cursor may be influenced by a jitter smoothing value.

Figure 3:
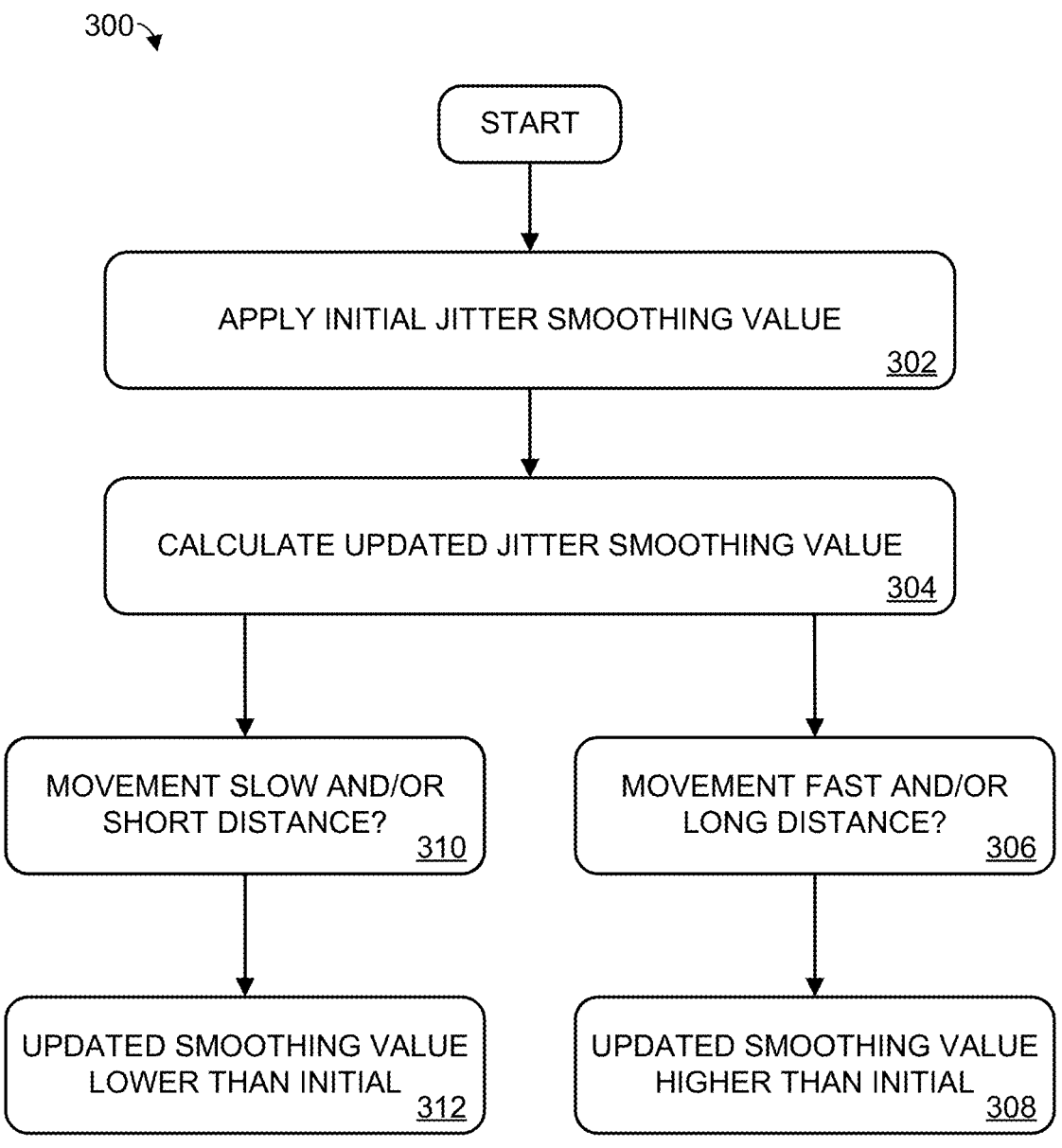
FIG. 3 shows an example processing flow describing a stability control operation for user input to a computing device.

FIG. 3 illustrates an example processing flow 300 for jitter smoothing. At 302, the computing system calculates and applies an initial smoothing value for a user input motion based on operating conditions, such as a display size, camera resolution, and hand size (or other body part size). The computing system may be configured to apply the initial smoothing value to the user input motion to reduce jitter.

At 304, the computing system calculates an updated jitter smoothing value for the user input motion as the user input motion is being performed. Such dynamic re-calculation of the smoothing value may be repeated according to any suitable sampling rate.

At step 306, the computing system is configured to determine if the user input motion is fast (e.g., greater than a threshold velocity) and/or a long movement (e.g., greater than a threshold distance). If so, then at step 308, the computing system increases the smoothing value and applies the updated smoothing value to the user input motion. Alternatively, at step 310, the computing system determines if the user input motion is slow (e.g., less than a threshold velocity) and/or is a precise movement (e.g., less than a threshold distance). If so, then at step 312, the computing system decreases the smoothing value and applies the updated smoothing value to the user input motion. Such dynamic stability control optimization operations may be performed to dynamically compensate for jitter, for example, when users have issues with shaky hands or when a computing system's refresh rate or resolution is too high. In other words, the movement of the displayed cursor may be influenced at least in part by the initial jitter smoothing value, and an updated jitter smoothing value that is calculated based on one or both of the distance of the movement of the user hand, and a speed of the movement of the user hand.

In some examples, the computing system may perform anchor point locking optimization operations based on the user input/gestures. This may include locking a displayed position of an on-screen graphical cursor until the end of a predefined input gesture performed by the user hand. Anchor points may be defined in terms of screen coordinates, where the X and Y coordinates of a cursor may be locked on a display when an action is performed. The computing system may be configured to lock the position of the cursor (or another salient UI element) to an anchor point based on the computing system detecting that a user is starting to form a gesture. The computing system may be configured to lock the cursor (or another salient UI element) to the anchor point until the computing system detects that the user is done performing the gesture. The computing system may be configured to dynamically select an anchor point that is most appropriate for a selected user interaction.

In some examples, the computing system may lock the cursor to the screen coordinates of an anchor point for some gestures, and the computing system may not lock the cursor to the screen coordinates to an anchor point for other gestures. An example anchor point locking decision table 400 is shown in FIG. 4. According to the decision table shown in FIG. 4, as one example, a thumb and index finger pinch gesture maps to a left mouse click operation. The anchor point for the thumb and index finger pinch gesture is the wrist. For this gesture, the computing system locks the cursor to the wrist anchor point while the gesture is being performed. As another example, a user's fingers may be balled into a fist gesture that maps to a middle mouse scroll operation. The anchor point for the fist gesture is the wrist. For this gesture, the computing system locks the cursor to the wrist anchor point while the gesture is being performed. As yet another example, an index finger up (pointing vertically) gesture maps to a drag and drop operation. The anchor point for the index finger up gesture is the index finger tip. For this gesture, the computing system does not lock the cursor to the anchor point while the gesture is being performed. As still yet another example, an open palm gesture maps to a move cursor operation. The anchor point for the open palm gesture is the palm of the user's hand. For this gesture, the computing system does not lock the cursor to the anchor point while the gesture is being performed. These gestures are provided as non-limiting examples. Any suitable gesture may have any suitable anchor point that may be used to selectively lock the cursor (or another salient UI element) to the screen coordinates of the anchor point while the gesture is being performed.

Figure 5:
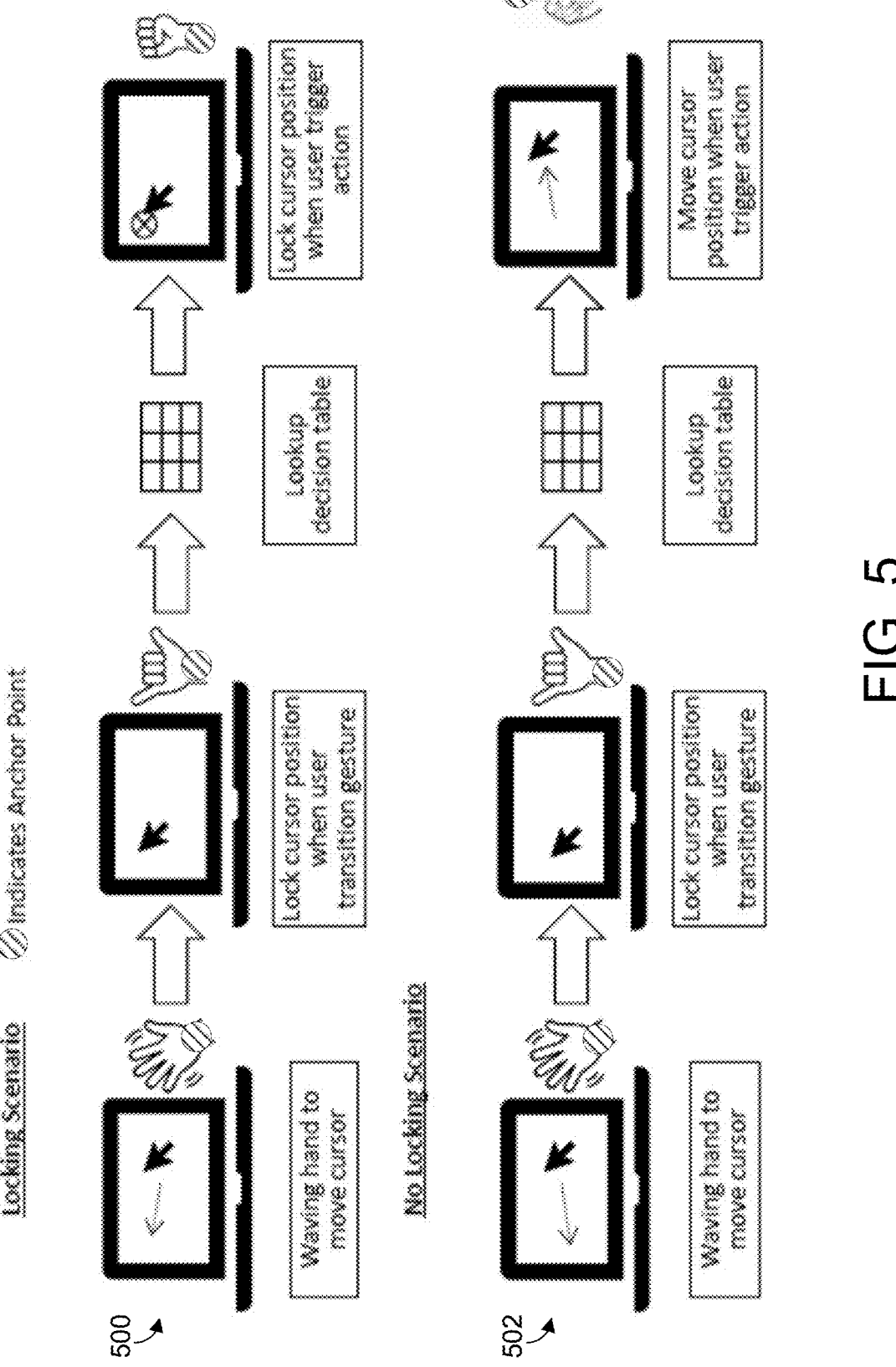
FIG. 5 shows example locking and non-locking scenarios that may be used for different gestures during a touchless interaction.

Example locking and non-locking scenarios are illustrated in FIG. 5. Specifically, FIG. 5 illustrates a locking process flow 500, and a non-locking process flow 502. In the example locking scenario 500 shown above in the top portion of FIG. 5, a user's hand waves to control movement of a cursor on the touchless user interface. At this point, the cursor is not locked to an anchor point corresponding the user's wrist so that the cursor can be moved around the touchless user interface. Next, the user's hand transitions to performing a gesture where the thumb and pinky finger are extended laterally. Based on recognizing initiation of the gesture, the computing system locks the cursor to an anchor point corresponding to the wrist of the user's hand while the gesture is being performed. The computing system recognizes the gesture and performs a look-up operation in a decision table to determine if the cursor should be locked to the anchor point based on the recognized gesture. In this case, the gesture triggers locking of the screen coordinates of the cursor to the anchor point on the user's wrist. Next, the user's hand is balled into a fist indicating a middle mouse button scrolling gesture in which the cursor is locked to an anchor point while the gesture is performed.

In the example non-locking scenario 502 shown in the bottom portion of FIG. 5, a user's hand waves to control movement of a cursor on the touchless user interface. At this point, the cursor is not locked to an anchor point corresponding the user's wrist so that the cursor can be moved around the touchless user interface. Next, the user's hand transitions to performing a gesture where the thumb and pinky finger are extended laterally. Based on recognizing initiation of the gesture, the computing system locks the cursor to an anchor point corresponding to the wrist of the user's hand while the gesture is being performed. The computing system recognizes the gesture and performs a look-up operation in a decision table to determine if the cursor should be locked to the anchor point based on the recognized gesture. In this case, the gesture does not trigger locking of the screen coordinates of the cursor to the anchor point on the user's wrist. Next, the user's hand assumes an index finger up gesture corresponding to a drag and drop operation in which the cursor is not locked to an anchor point while the gesture is performed, and the cursor moves around the touchless user interface while a drag and drop operation is performed.

The above-described scenarios are provided as non-limiting examples of anchor point locking optimization operations that may be performed by the computing system. Such anchor point locking optimization operations may be performed to prevent accidental triggers and/or inaccurate cursor control which can result in unintended results.

Figure 13:
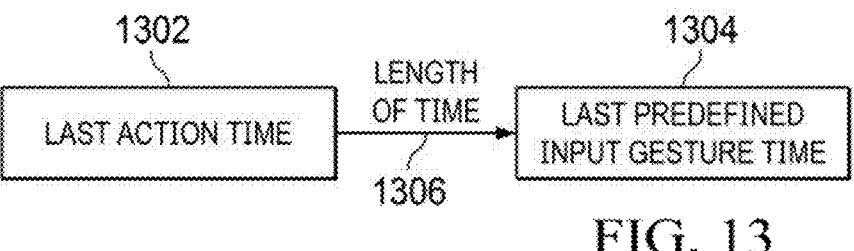
FIG. 13 shows an example length of time since a last computer control action was performed in response to a last predefined input gesture—e.g., how long it has been since the computer last performed a "click" action in response to a user gesture.

During a touchless user interaction, when a user's hand lingers in the same place, multiple input gestures may be recognized unintentionally—e.g., "click" or "select" type inputs. Such unintentional input may cause inaccurate control and user frustration during a touchless interaction. In some examples, to address such issues, the computing system may be configured to perform optimization operations that inhibit unintentional multi-click user input. More generally, the plurality of user intent parameters may include a length of time since a last computer control action was performed in response to a last predefined input gesture— e.g., how long it has been since the computer last performed a "click" action in response to a user gesture. FIG. 13 shows a length of time 1306 between a time 1302 of a last computer control action performed to a time 1304 of a last predefined input gesture.

Figure 6:
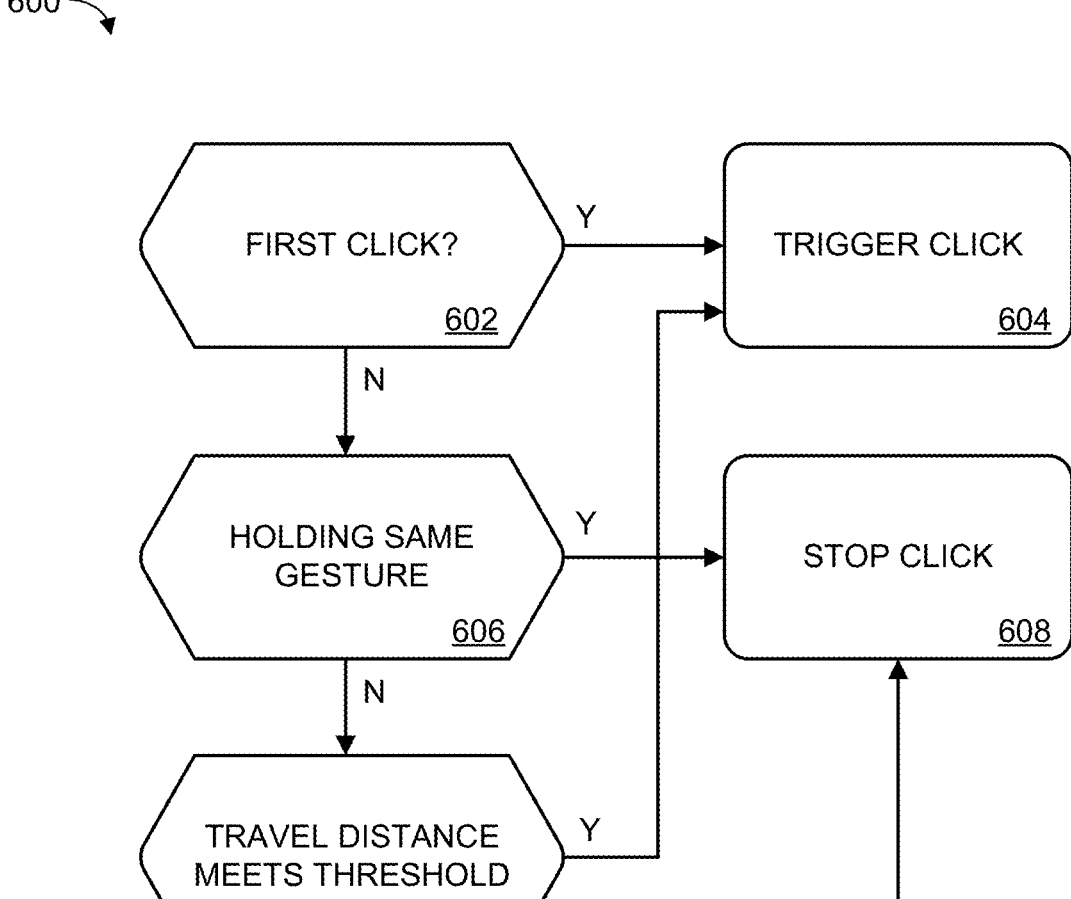
FIG. 6 shows an example processing flow describing operations that may be performed by the computing device to inhibit unintentional multi-click user input.

An example processing flow 600 describing optimization operations that may be performed by the computing system to inhibit unintentional repeated user input is illustrated with respect to FIG. 6. The example of FIG. 6 specifically focuses on "click" type actions, although it will be understood that this is non-limiting—rather, steps of FIG. 6 may similarly be performed for any type of computer action performed in response to a user gesture.

The process flow begins with a gesture being detected, such as a thumb and index finger pinch gesture that maps to a click command. If the click gesture is detected, it is determined at 602 if it is a first click—e.g., the first click detected since the device was powered on, awakened from a resting state, since a particular user has logged in, since a threshold time has elapsed, and/or since any other suitable condition has been met. If it is a first click, then the click is triggered at 604, meaning a click command is issued.

If it is not a first click (e.g., it is a second click instead), then it is determined at 606 if the user's hand is still holding the same gesture (e.g., the thumb and index finger pinch gesture). If the same gesture is still being held than the click is stopped at 608, meaning that a click command is not issued. Otherwise, if the same gesture is not still being held, then a cursor travel distance is calculated at 610. If the cursor travel distance meets a threshold distance, then another click command is issued. Otherwise, if the cursor travel distance does not meet the threshold distance, then the click is stopped meaning that a click command is not issued. The example process flow shown in FIG. 6 leverages time, movement, and position of the cursor and/or user input to make decisions about which clicks are intentional and which clicks are unintentional clicks. The example process flow shown in FIG. 6 may be performed by the computing system whenever a click gesture is detected to stop unintentional click commands from being issued.

Figure 8:
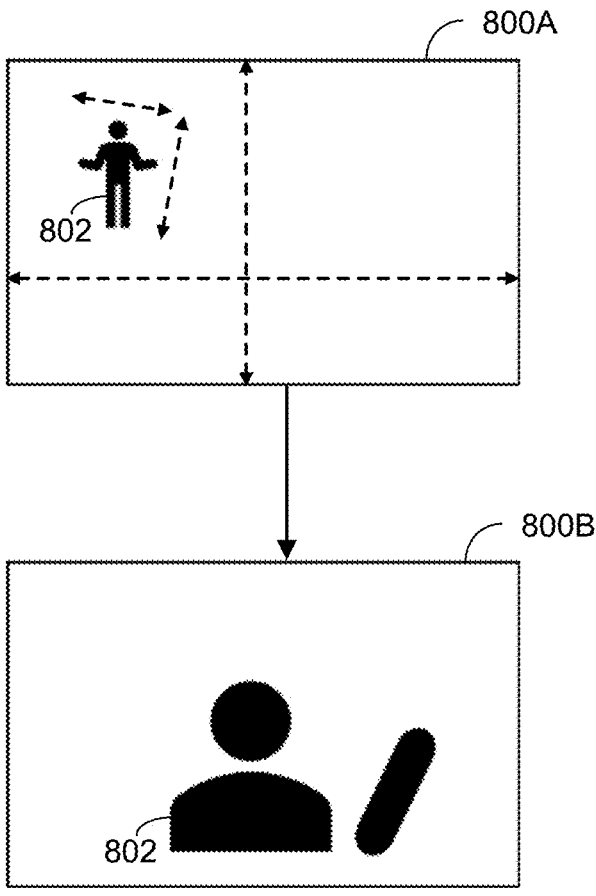
FIG. 8 shows an example scenario in which cropping and/or zooming is applied to an image depicting a human user.

In some instances, a touchless user interface is visually presented on a display that is too large to navigate with a user's arm reach alone. For example, such instances may occur with giant monitors or when a user is far away from a display. In these instances, the computing system may be configured to perform optimization operations in the form of lock and scroll operations instead of relying on hand position as basis for cursor position, or a cropping/zooming technique to resize the image to use dimensions more suitable for interaction. Two example lock and scroll scenarios are shown in FIG. 7, while FIG. 8 illustrates a crop/zoom technique.

In the first example scenario 700 shown in the top portion of FIG. 7, a locking gesture is performed to reposition the cursor. In step 1, the cursor is unlocked, and the hand only has enough reach to move the cursor in a bottom right interaction region of the touchless user interface indicated by the boundary box. In order to interact with a different region of the touchless user interface, in step 2, the user performs a locking gesture, by forming a fist in this example. Based on the locking gesture being detected, the cursor position is locked and the touchless user interface is shifted relative to the locked cursor position. In particular, the interaction region is shifted from the bottom left to the middle of the touchless user interface centered on the cursor. In step 3, the user maintains the closed fist gesture and moves the position of the hand to shift the interaction region relative to the cursor. In step 4, the user's hand is opened to unlock the position of the cursor so that it can be moved within the interaction region.

In the second example scenario 702 shown in the bottom portion of FIG. 7, a point gesture is performed to reposition the cursor. In step 1, the cursor is unlocked, and the hand only has enough reach to move the cursor in a bottom right interaction region of the touchless user interface indicated by the boundary box. In step 2, the user performs a pointing gesture with the index finger to point in a direction of travel for the cursor, upward in this instance. In step 3, the cursor travels in the pointed direction until the user ceases performing the pointing gesture. In step 4, the user's hand is opened from the pointing gesture to allow for the cursor to be moved within the shifted interaction region.

These example optimization operations for locking and shifting the cursor can be performed to reduce user fatigue when interacting with the touchless user interface. For example, instead of having to hold the user's hand in a specified position, the user can lock the cursor in place while letting their hand rest.

FIG. 8 illustrates an example scenario where cropping and/or zooming is applied based on the distance between the user and the computing device. Specifically, FIG. 8 shows two different images 800A and 800B captured by a camera of the computing device—e.g., camera 106 of FIG. 1A. In FIG. 8, the body 802 of a human user has a relatively small size as compared to the overall size of the captured image, which can indicate that the user is relatively far from the device. As such, image 800B is cropped/zoomed to focus on user 802, which can facilitate easier interaction with the computing device. In other words, the plurality of images may be cropped and/or zoomed based at least in part on a visible size of the human user in the plurality of images.

In some examples, the computing system may be configured to track a user's set of inputs over time and apply context awareness to improve responsiveness. For example, if the application is a quick service ordering menu, the locations of "click" actions can be tracked over time, so that faster cursor movement can occur the further the distance from previously tracked "click" action points, and slowed as they get closer to known "click" action points. If an order comprises several actions in sequence, the next actions in the sequence can be predicted and used as suggested actions.

Figure 9:
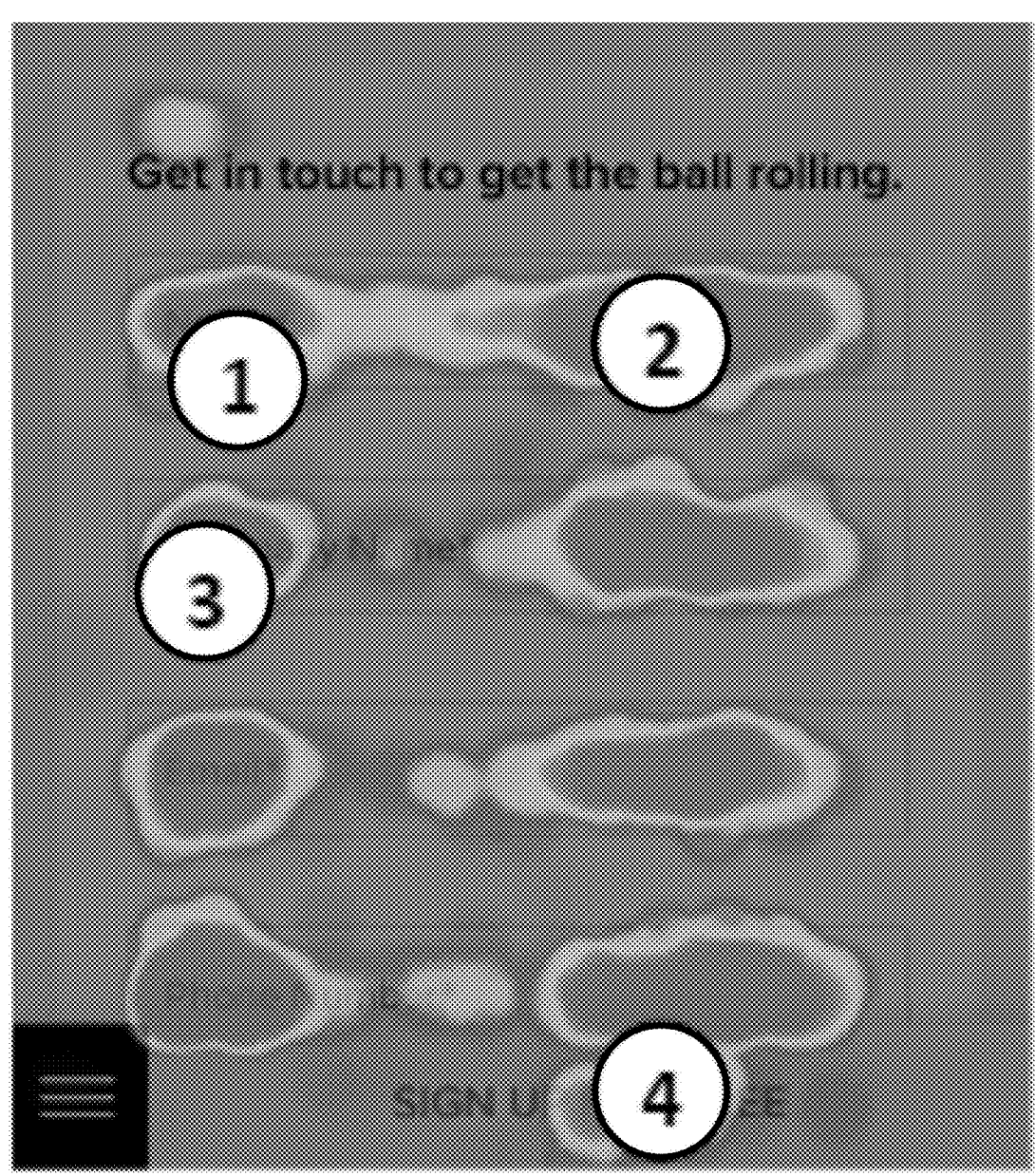
FIG. 9 shows an example scenario in which context awareness is employed by the computing system for optimizing a touchless user interaction.

An example scenario in which context awareness is employed by the computing system is shown in FIG. 9. The computing system may be configured to learn the areas of the touchless user interface that users interact with most frequently over time. Specifically, FIG. 9 shows an example interface 900 depicted as a greyscale heat map of user interaction, with areas of highest interaction indicated by lighter shades, moving to darker shades for areas of lower interaction. Further, the computing system may be configured to learn over time the order of steps in an interaction sequence, and areas of the interface corresponding to those steps. For example, in FIG. 9, an example touchless interaction may involve interacting with areas 1-4 in that order to carry out the touchless interaction. The computing system may be configured to dynamically adjust cursor movement, click speed, etc., in accordance with how frequently the areas are used in order to improve accuracy of touch input during a touchless interaction.

Returning briefly to FIG. 2, at 208, method 200 includes mapping the predefined input gesture to a computer control action. More generally, the computing system may map the recognized gesture to an action, operation, and/or event that is performed/tracked by the computing system and/or the touchless user interface. In some examples, the computing system may use a database (e.g., a look up table) that associates gestures with computing actions, operations, and/ or events to perform such mapping. Any suitable gesture may be mapped to any suitable computing action, operation, and/or event in the database stored in a storage device of the computing system.

Returning to the example of hovering over a UI element, the recognized action (e.g., detected finger, hovered over a UI element for longer than a threshold amount of time) is then mapped to an event supported by the UI—e.g., index finger hovering for more than 0.5 seconds=key press; index and middle fingering hovering for more than 0.5 seconds—double click. As indicated throughout, in many instances a display may be employed to provide visual feedback as to movement/position, e.g., of a user's fingers. In the example of hovering over a UI element, a display may visually present visual feedback of the user's fingertip as it moved across a displayed number pad and then settled over a particular displayed digit. After the threshold hover time (e.g., 0.5 seconds), the system would then map that action (hover exceeding threshold) to selection of that digit for entry into a calculator or other number-receiving application. In other examples, the display may visually present other forms of visual feedback to the user(s) of touchless user input.

In some examples, the computing system may be configured to combine mapping of a gesture to mouse, keyboard, and/or touch actions. In some examples, the mapping can be applied system-wide or can be customized for individual users. In some examples, the mapping can be different for different contexts, such as different mappings for gaming or work applications. For instance, as discussed above, the techniques described herein may in some cases be applied in multi-user settings. Thus, mapping the predefined input gesture to the computer control action can include detecting movement of a second user hand of a second human user—e.g., the two hand movements together are mapped to a single control action, such as a video game control input. As another example, different mappings may be applied to different application programs, such as different mappings for video conference meetings and video game applications.

An example mapping scheme is shown in FIG. 10, showing an example mapping table 1000. In the example mapping scheme, a thumb and index finger pinch gesture is mapped to a left mouse click command for all computing applications executed by the computing system. Further, the gesture is mapped to the left mouse click command for work related contexts. A fist gesture is mapped to a middle mouse scroll command for all computing applications executed by the computing system. Further, the gesture is mapped to the middle mouse scroll command for home related contexts. A pointing index finger up gesture is mapped to a drag and drop command for an "Alien attack" video game and video calling application executed by the computing system. Further, the gesture is mapped to the drag and drop operation for work and game contexts. A palm open gesture is mapped to a move mouse cursor command for all computing applications executed by the computing system. Further, the gesture is mapped to the move mouse cursor command for home contexts. The mapping scheme shown in FIG. 10 is provided a non-limiting example. Any suitable context-based mapping scheme may be contemplated herein.

Returning briefly to FIG. 2, at 210, the computing system performs the computer control action in response to the predefined input gesture. In other words, the computing system triggers the appropriate computing action, operation, and/or event to be performed in the touchless user interface or an appropriate computing application that is mapped to the gesture. In some examples, the computing system may record or log the performed action, operation, and/or event for use in future analysis of user intent when providing future touchless user input.

It will be appreciated that in some examples, the system described herein provides the benefit of enabling touch-free user input. For example, the techniques described herein can be embodied at point-of-sale so to replace touchscreen/pen-based entry of quantity, item code, signature, and indication of intention to checkout. Existing functionality that does not require contact can remain intact and seamlessly integrate with the described interface.

The techniques described herein may seamlessly integrate with the increasingly prevalent AR/VR technologies. For example, in lieu of a separately-mounted camera, AR and VR headsets can incorporate the functionality described herein. Instead of displaying UI elements on a screen externally, these devices would project UI on glasses and users would interact with UI using hand and fingers.

While the present discussion refers frequently to "gestures," it will be appreciated that such language extends also to the simple position/location of a user body part. For example, in some cases it may only be important to locate the user's finger tip—e.g., that it has entered into a particular XY location/placement, without it necessarily being important that such a condition arise through particular hand/arm motions.

Any or all of the herein-described methods and processes may be implemented as an executable application, a network-accessible service, an application-programming interface (API), a library, and/or any other suitable computer resources or combinations of computer resources.

Figure 11:
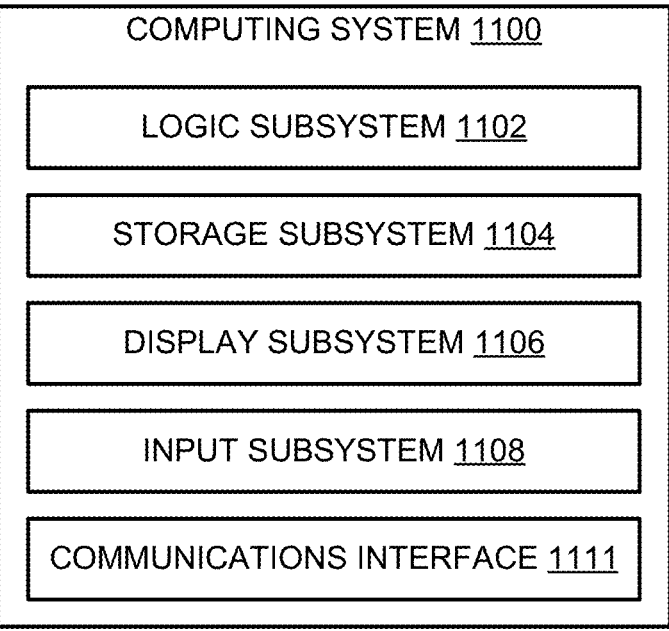
FIG. 11 schematically shows an example computing system.

FIG. 11 schematically shows a simplified representation of a computing system 1100 configured to perform any or all of the techniques described herein. Computing system 1100 may take the form of one or more personal computers, network-accessible server computers, mobile computing devices, mobile communication devices (e.g., smart phone), Internet of Things (IoT) devices, embedded computing devices, and/or other computing devices.

Computing system 1100 includes a logic subsystem 1102 and a storage subsystem 1104. Computing system 1100 may optionally include a display subsystem 1106, input subsystem 1108, communication subsystem 1110, and/or other subsystems not shown in FIG. 11.

Logic subsystem 1102 includes one or more physical logic devices configured to execute computer instructions. For example, the logic subsystem may include hardware elements configured to execute instructions that are part of one or more software applications or other executable data constructs, and/or the logic subsystem may include one or more hardware or firmware elements configured to execute hardware or firmware instructions. Processors of the logic subsystem may have any suitable number of cores, and may execute instructions via sequential, parallel, and/or distributed processing. Individual components of the logic subsystem optionally may be distributed among two or more separate devices, which may in some cases be remotely located. In some cases, aspects of the logic subsystem may be virtualized and executed by remotely-accessible, networked computing devices—e.g., configured in a cloud-computing configuration.

Storage subsystem 1104 includes one or more physical storage devices configured to temporarily and/or permanently hold computer information—e.g., instructions executable by the logic subsystem, and/or other suitable data. When the storage subsystem includes two or more devices, the devices may be collocated and/or remotely located. Storage subsystem 1104 may include volatile, non-volatile, dynamic, static, read/write, read-only, random-access, sequential-access, location-addressable, file-addressable, and/or content-addressable devices. Storage subsystem 1104 may include removable and/or built-in devices. In some cases, execution of instructions by the logic subsystem may change the data stored by the storage subsystem—e.g., to store new data.

In some cases, any or all aspects of logic subsystem 1102 and/or storage subsystem 1104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperatively implement one or more logic machines. As used herein, the term "machine" is used generally to refer to the combination of computer hardware, firmware, software, instructions, and/or any other components that together provide computer functionality. In other words, "machines" are never abstract ideas and always have a tangible form. A machine may be instantiated by a single computing device, or a machine may be distributed between components of two or more different computing devices. A machine may include a local component (e.g., software application executed by a local computer processor) cooperating with a remote component (e.g., a network-accessible service provided by one or more remote computing devices).

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1106 may be used to present a visual representation of any or all data held by storage subsystem 1104. As one example, the visual representation may take the form of a user interface that presents information to and optionally receives input from a human user. Display subsystem 1106 may include one or more display devices utilizing virtually any suitable type of display technology.

When included, input subsystem 1108 may comprise or interface with one or more input devices. Input devices may include user input devices and/or sensor input devices. Non-limiting examples of user input devices may include a keyboard, mouse, or touch screen. Input devices of the input subsystem may include integrated devices and/or peripheral devices.

When included, communication subsystem 1110 may be configured to communicatively couple any or all components of computing system 1100 with one or more other computer components—e.g., corresponding to other computing devices. Communication subsystem 1110 may include wired and/or wireless communication devices compatible with any suitable data communication protocols. The communication subsystem may be configured for communication via personal-, local- and/or wide-area networks.

Figure 12:
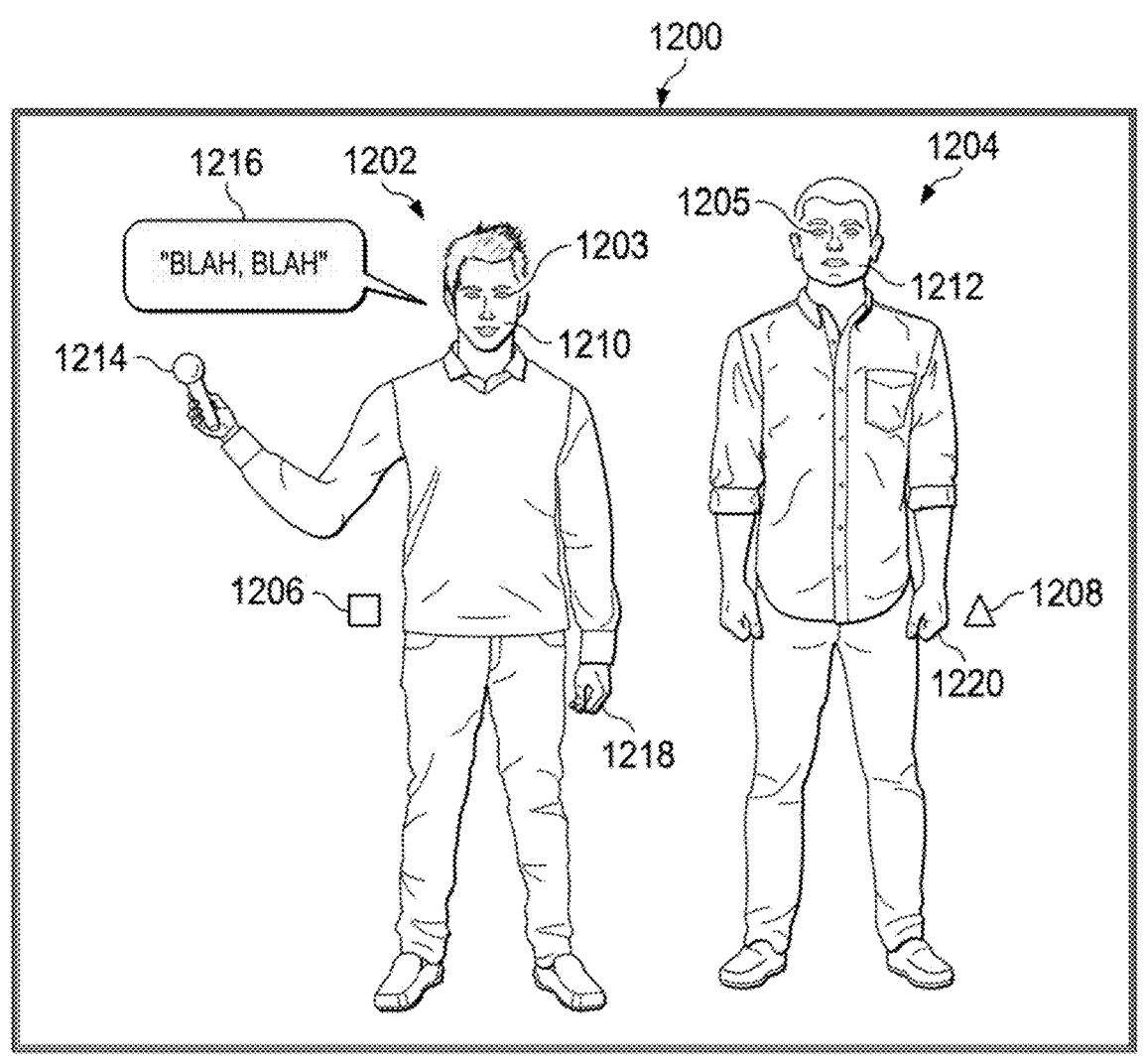
FIG. 12 shows an example image with two human users.

FIG. 12 shows an example image with two human users 1202 and 1204, each having an identity 1206 and 1208. The first human user 1202 has a face 1210 that can be used to identify his or her identity 1206. The second human user has a second face 1212 that can be used to identify his or her identity 1208. The first human user 1202 has a recognizable object 1214 in his or her hand. The first human user 1202 is also speaking audible words, generically shown as "blah blah", that can be detected by the computing system. In the illustrated embodiment, the first human user has two eyes 1203 and two hands 1218, and the second human user 1204 has two eyes 1205 and two hands 1220.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of controlling a computing device, the method comprising:

identifying a user interface and a context;

receiving, from a camera, a plurality of first images depicting a first user hand of a first human user;

processing at least the plurality of first images to detect an activation gesture performed by the first user hand of the first human user;

detecting satisfaction of an input activation condition based on at least detecting the activation gesture of the first user hand of the first human user, the satisfaction of the input activation condition causing the computing device to focus on the first human user;

responsive to the satisfaction of the input activation condition by the first human user, processing a plurality of second images to detect one of a plurality of candidate input gestures or to detect a deactivation gesture by the first human user, the plurality of candidate input gestures being associated with the user interface and with the context, the plurality of candidate input gestures including candidate cursor movement gestures for controlling cursor movement of an on-screen graphical cursor and candidate control event gestures for initiating respectively computer control events other than the cursor movement of the on-screen graphical cursor;

upon detecting the deactivation gesture by the first human user, suspending processing further images for the one of a plurality of candidate input gestures by the first human user;

upon detecting a particular cursor movement gesture of the candidate cursor movement gestures by the first human user, controlling the computing device to control the cursor movement of the on-screen graphical cursor according to the particular cursor movement gesture;

upon detecting a start of a hand movement pattern by the first human user that may be associated with one of the candidate control event gestures, reducing or preventing the cursor movement of the on-screen graphical cursor while the hand movement pattern by the first human user is being performed; and after identifying a particular candidate control event gesture of the candidate control action gestures based on the hand movement pattern by the first human user, mapping the particular candidate control event gesture to a particular computer control event of the candidate control events; and performing the particular computer control event.

2. The method of claim 1, wherein the plurality of first images captured by the camera include two-dimensional image pixel data having RGB color values.

3. The method of claim 2, wherein the camera is a webcam integrated into the computing device.

4. The method of claim 1, wherein the plurality of first images further depicts a first user eye of the first human user, and wherein the detecting the satisfaction of the input activation condition is further based on a detected gaze direction of the first user eye.

5. The method of claim 1, wherein the plurality of first images further depicts one or more additional first user body parts of the first human user other than the first user hand, and wherein the detecting the satisfaction of the input activation condition is further based on one or more detected poses of the one or more additional first user body parts.

6. The method of claim 1, wherein the detecting the satisfaction of the input activation condition is further based on detecting a second human user in the plurality of first images.

7. The method of claim 1, further comprising identifying the first human user, and wherein the detecting the satisfaction of the input activation condition is further based on a recognized identity of the first human user.

8. The method of claim 7, wherein the plurality of first images further depicts a face of the human user, and the recognized identity is based on facial recognition.

9. The method of claim 1, wherein the plurality of first images further depicts a recognized object held by the first user hand, and wherein the detecting the satisfaction of the input activation condition is further based on detecting a presence of the recognized object.

10. The method of claim 1, further comprising capturing speech, and wherein the detecting the satisfaction of the input activation condition is further based on the captured speech.

11. The method of claim 1, further comprising determining a length of time since a last computer control action was performed in response to a last input gesture, and wherein the detecting the satisfaction of the input activation condition is further based on the length of time since the last computer control action was performed in response to the last input gesture.

12. The method of claim 1, wherein the plurality of second images further depicts a second user hand of a second human user, and wherein the mapping the particular candidate control event gesture to the particular computer control event further includes detecting movement of the second user hand of the second human user and mapping the detected movement of the second user hand of the second human user to the particular computer control event.

13. The method of claim 1, further comprising displaying the on-screen graphical cursor associated with the first user hand.

14. The method of claim 13, further comprising displaying a second on-screen graphical cursor associated with a second user hand of a second human user.

15. The method of claim 13, further comprising moving the on-screen graphical cursor by a distance and in a direction determined based at least in part on detected movement of the first user hand.

16. The method of claim 15, wherein moving the on-screen graphical cursor is influenced at least in part by an initial jitter smoothing value, and an updated jitter smoothing value calculated based on one or both of the distance of the detected movement of the first user hand and a speed of the detected movement of the first user hand.

17. The method of claim 13, further comprising locking the on-screen graphical cursor until completion of the particular candidate control event gesture.

18. The method of claim 1, further comprising cropping or zooming the plurality of first images based at least in part on a visible size of the first human user in the plurality of first images.

19. A computing device, comprising:
a camera;
a logic subsystem; and
a storage subsystem holding instructions executable by the logic subsystem to:
identify a user interface and a context;
receive, from the camera, a plurality of first images depicting a first user hand of a first human user;
process at least the plurality of first images to detect an activation gesture performed by the first user hand of the first human user;
detect satisfaction of an input activation condition based on at least detecting the activation gesture of the first user hand of the first human user, the satisfaction of the input activation condition causing the computing device to focus on the first human user;
responsive to the satisfaction of the input activation condition by the first human user, process a plurality of second images to detect one of a plurality of candidate input gestures or to detect a deactivation gesture by the first human user, the plurality of candidate input gestures being associated with the user interface and with the context, the plurality of candidate input gestures including candidate cursor movement gestures for controlling cursor movement of an on-screen graphical cursor and candidate control event gestures for initiating respectively computer control events other than the cursor movement of the on-screen graphical cursor;

upon detecting the deactivation gesture by the first human user, suspend processing further images for the one of a plurality of candidate input gestures by the first human user;

upon detecting a particular cursor movement gesture of the candidate cursor movement gestures by the first human user, control the computing device to control the cursor movement of the on-screen graphical cursor according to the particular cursor movement gesture;

upon detecting a start of a hand movement pattern by the first human user that may be associated with one of the candidate control event gestures, reduce or prevent the cursor movement of the on-screen graphical cursor while the hand movement pattern by the first human user is being performed; and after identifying a particular candidate control event gesture of the candidate control action gestures based on the hand movement pattern by the first human user, map the particular candidate control event gesture to a particular computer control event of the candidate control events; and perform the particular computer control event.

\* \* \* \* \*